: US 11,541,789 B2
(45) Date of Patent: Jan. 3, 2023

(12) United States Patent
Robinson et al.

(10) Patent No.: US 11,541,789 B2
(45) Date of Patent: Jan. 3, 2023

(54) EXTRUDED NON-WOVEN AND J-CLIP

(71) Applicant: TOYOTA BOSHOKU KABUSHIKI KAISHA, Aichi-ken (JP)

(72) Inventors: Emily Robinson, Brighton, MI (US); Michael Kuranc, Saint Clair Shores, MI (US); Anup Viswanathan, Ann Arbor, MI (US); Glen Miller, Madison Heights, MI (US)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/704,556

(22) Filed: Dec. 5, 2019

(65) Prior Publication Data

US 2020/0262323 A1 Aug. 20, 2020

Related U.S. Application Data

(60) Provisional application No. 62/807,525, filed on Feb. 19, 2019.

(51) Int. Cl.
*B60N 2/58* (2006.01)
*B60N 2/60* (2006.01)
*B29C 65/70* (2006.01)
*B29C 65/62* (2006.01)
*F16B 2/22* (2006.01)

(52) U.S. Cl.
CPC ............ *B60N 2/5825* (2013.01); *B29C 65/70* (2013.01); *B60N 2/5866* (2013.01); *B60N 2/5883* (2013.01); *B60N 2/6027* (2013.01); *B60N 2/6072* (2013.01); *B29C 65/62* (2013.01); *B60N 2/5875* (2013.01); *B60N 2/609* (2013.01); *B60N 2/6081* (2013.01); *F16B 2/22* (2013.01)

(58) Field of Classification Search
None
See application file for complete search history.

(56) References Cited

U.S. PATENT DOCUMENTS

| | | | |
|---|---|---|---|
| 3,423,775 A | | 1/1969 | Cockerill |
| 4,602,817 A | * | 7/1986 | Raftery ................... A47C 4/02 24/339 |
| 4,603,907 A | | 8/1986 | Witzke |
| 4,925,071 A | * | 5/1990 | Fleming ................. A01D 46/22 224/236 |

(Continued)

FOREIGN PATENT DOCUMENTS

| | | | |
|---|---|---|---|
| JP | 11089663 A | * | 4/1999 |
| JP | 2000189294 A | * | 7/2000 |
| WO | 2004014690 | | 2/2004 |

OTHER PUBLICATIONS

International Search Report and Written Opinion for International Application No. PCT/US2019/064673 dated Apr. 28, 2020.

(Continued)

*Primary Examiner* — David E Allred
(74) *Attorney, Agent, or Firm* — Greenblum & Bernstein, P.L.C.

(57) ABSTRACT

In one example, a vehicle seat includes a non-woven and a J-clip, wherein the non-woven is secured to the J-clip to define a single component. The vehicle seat includes a trim cover attached to the non-woven, and the J-clip is attached to a cushion frame to attach the trim cover to the cushion frame.

25 Claims, 1 Drawing Sheet

(56) References Cited

U.S. PATENT DOCUMENTS

| | | | |
|---|---|---|---|
| 5,013,089 A | 5/1991 | Abu-Isa et al. | |
| 5,295,732 A | 3/1994 | Boisset | |
| 5,382,083 A | 1/1995 | Fecteau et al. | |
| 5,439,271 A | 8/1995 | Ryan | |
| 5,468,050 A | 11/1995 | Hall et al. | |
| 5,582,463 A | 12/1996 | Linder et al. | |
| 5,820,212 A | 10/1998 | Hoshino et al. | |
| 5,820,213 A | 10/1998 | Severinski | |
| 5,971,478 A | 10/1999 | Hurite | |
| 6,364,347 B1 | 4/2002 | Holdampf et al. | |
| 6,601,901 B1 | 8/2003 | Schambre et al. | |
| 10,343,566 B2* | 7/2019 | Yokoyama | B60N 2/72 |
| 2002/0074845 A1* | 6/2002 | Perske | B60N 2/5825 297/452.6 |
| 2003/0215601 A1* | 11/2003 | Pedde | B29C 44/1271 428/102 |
| 2004/0016565 A1* | 1/2004 | Gallant | H01B 7/40 174/117 F |
| 2004/0061254 A1* | 4/2004 | Snooks | B60N 2/5825 264/250 |
| 2005/0150090 A1* | 7/2005 | Pedde | F16B 5/0692 24/698.1 |
| 2007/0011853 A1* | 1/2007 | Smith | B60N 2/5841 24/545 |
| 2008/0258523 A1* | 10/2008 | Santin | B60N 2/5825 297/218.2 |
| 2009/0064471 A1* | 3/2009 | Santin | B60N 2/5825 24/581.11 |
| 2010/0118554 A1* | 5/2010 | Kraus, Jr | H02G 3/24 362/396 |
| 2012/0038200 A1 | 2/2012 | Stankiewicz et al. | |
| 2012/0319448 A1* | 12/2012 | Mineta | B60N 2/36 297/452.1 |
| 2013/0247338 A1* | 9/2013 | Santin | B29C 39/10 24/545 |
| 2013/0249269 A1* | 9/2013 | Sasaki | B60N 2/5816 297/452.18 |
| 2014/0042792 A1* | 2/2014 | Kajiwara | B60N 2/5825 297/463.1 |
| 2015/0132422 A1* | 5/2015 | Yamada | B29C 31/008 425/3 |
| 2015/0251623 A1* | 9/2015 | Fujiwara | B60R 21/215 280/728.2 |
| 2015/0307001 A1* | 10/2015 | Sahashi | B60N 2/5825 297/218.2 |
| 2015/0307011 A1* | 10/2015 | Ushiyama | B60N 2/0715 297/344.1 |
| 2015/0322983 A1* | 11/2015 | Eisenkolb | A47H 13/16 16/87.2 |
| 2016/0317047 A1 | 11/2016 | Sugiyama | |
| 2020/0248864 A1* | 8/2020 | Dickinson | A47G 1/16 |
| 2020/0315364 A1* | 10/2020 | Tribble | A47C 21/022 |
| 2021/0061147 A1* | 3/2021 | Karges | B60N 2/5825 |
| 2021/0112993 A1* | 4/2021 | Adachi | A47C 31/023 |

OTHER PUBLICATIONS

Trim-Lok J Clip. Aug. 24, 2018.
International Preliminary Report on Patentability for International Application No. PCT/US2019/064673 dated Sep. 2, 2021.

* cited by examiner

EXTRUDED NON-WOVEN AND J-CLIP

REFERENCE TO PRIOR APPLICATION

This application claims the benefit of U.S. Provisional Application No. 62/807,525 filed Feb. 19, 2019.

BACKGROUND

A J-clip is attached to a trim cover, and the J-clip attaches to a cushion frame to attach the trim cover to the cushion frame. When approximately 250 N of force is applied, the J-clip can disengage from the cushion frame, requiring the J-clip to be manually reattached to the cushion frame.

SUMMARY

In an embodiment, a vehicle seat or vehicle seat module includes a non-woven and a J-clip. The non-woven is secured to the J-clip to define a single component. The vehicle seat includes a trim cover attached to the non-woven, and the J-clip is attached to a cushion frame to attach the trim cover to the cushion frame.

In another embodiment according to any of the previous embodiments, the J-clip is polypropylene.

In another embodiment according to any of the previous embodiments, the non-woven is polyester In another embodiment according to any of the previous embodiments, the non-woven is secured to the J-clip with an adhesive.

In another embodiment, the non-woven is secured to the J-clip with stitches formed by sewing.

In another embodiment according to any of the previous embodiments, the non-woven is secured to the J-clip by molding a portion of the J-clip around the non-woven.

In another embodiment according to any of the previous embodiments, the non-woven is attached to the trim cover with stitches along a sewing line.

In another embodiment according to any of the previous embodiments, the non-woven is attached to the trim cover with stitches along a sewing line.

In another embodiment according to any of the previous embodiments, a foam pad is located between the trim cover and the cushion frame.

In another embodiment according to any of the previous embodiments, the J-clip is attached to one side of the non-woven.

In another embodiment according to any of the previous embodiments, the J-clip is attached to both sides of the non-woven.

In another embodiment according to any of the previous embodiments, the non-woven is secured to the J-clip by molding a portion of the J-clip around the non-woven such that the non-woven is inside a portion of the J-clip.

In another embodiment according to any of the previous embodiments, the portion of the non-woven is located within a straight portion of the J-clip.

In another embodiment, a vehicle seat or vehicle seat module includes a polyester non-woven comprising polypropylene and a J-clip including a straight portion and a curved portion. The polyester non-woven is located within the straight portion of the J-clip such that the J-clip is attached to both sides of the polyester non-woven to secure the polyester non-woven to the J-clip, and the curved portion of the J-clip receives a portion of a cushion frame to attach a trim cover to the cushion frame. The vehicle door includes A trim cover attached to the polyester non-woven with stitches along a sewing line and a foam pad located between the trim cover and the cushion frame.

In another embodiment, a method of transferring a load on a vehicle seat includes the step of applying a load on a vehicle seat and transferring a force to a non-woven attached to a J-clip to bend the non-woven attached to a J-clip. The J-clip is attached to a cushion frame.

BRIEF DESCRIPTION OF THE DRAWINGS

Other advantages of the present invention can be understood by reference to the following detailed description when considered in connection with the accompanying drawings wherein.

DETAILED DESCRIPTION

Figure 1:
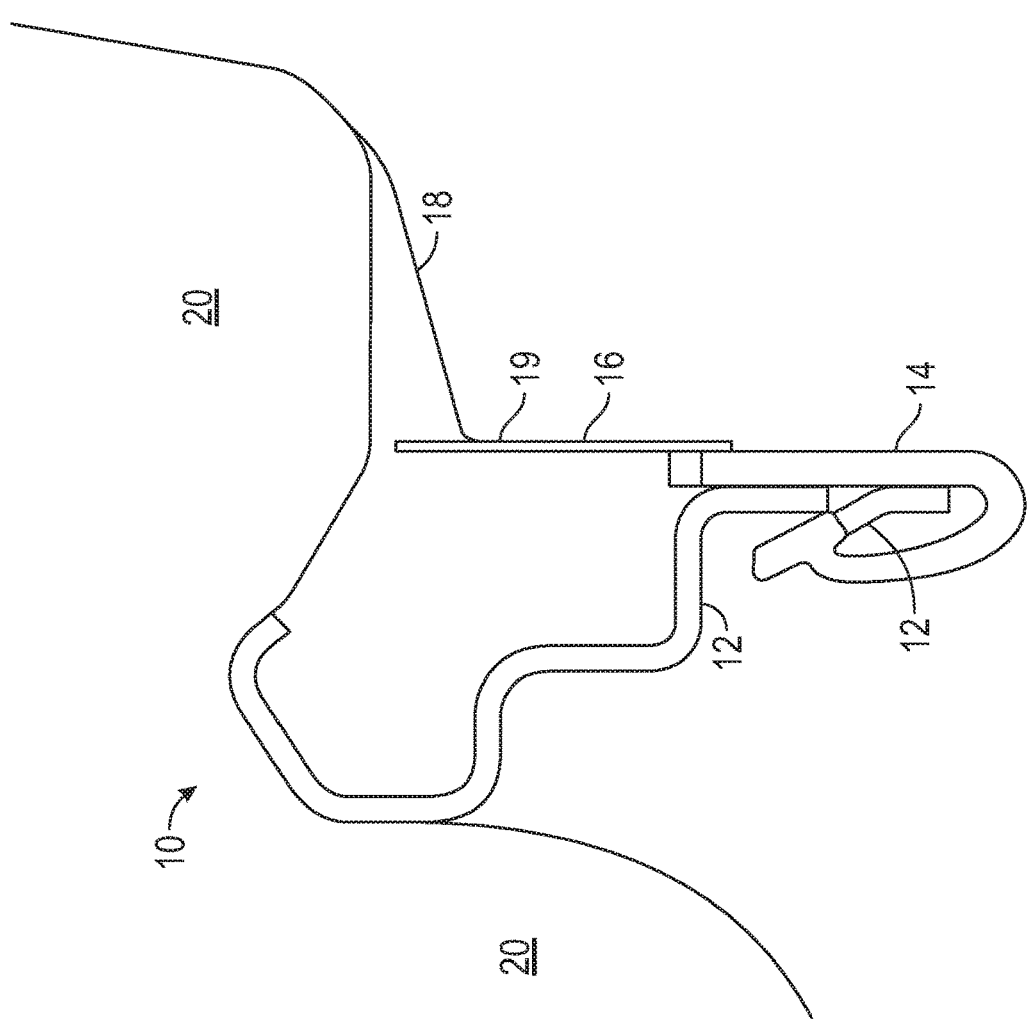
FIG. 1 schematically illustrates a side view of a J-clip engaged on a cushion frame.

As shown in FIG. 1, a vehicle seat 10 includes a cushion frame 12. A J-clip 14 is clipped on a portion of the cushion frame 12. In one example, the curved portion of the J-clip 14 receives the portion of the cushion frame 12. In one example, the J-clip 14 is polypropylene. The J-clip 14 is secured to an extruded non-woven 16 (4.4 oz/yd$^2$) or carpet (264 g/m$^2$ or 400 g/m$^2$). In one example, an adhesive is used to secure the J-clip 14 to the non-woven 16 to form a single component. In another example, the J-clip 14 can be secured to the non-woven 16 by stitches formed by sewing to form a single component, as shown in FIG. 2.

The non-woven 16 is attached to a trim cover 18. In one example, the non-woven 16 is polyester. In one example, the non-woven is 4.4 oz/yd$^2$. In one example, the non-woven 16 is sewn to the trim cover 18 with stitches at a sewing line 19. The non-woven 16 and the J-clip 14 hold the trim cover 18 to the cushion frame 12. A foam pad 20 is located between the trim cover 18 and the cushion frame 12.

Figure 3:
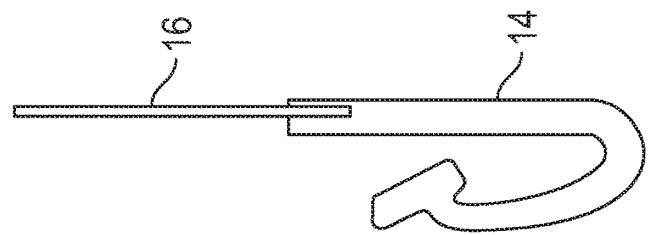
FIG. 3 schematically illustrates a side view of a second embodiment of the J-clip attached to the non-woven.
Figure 2:
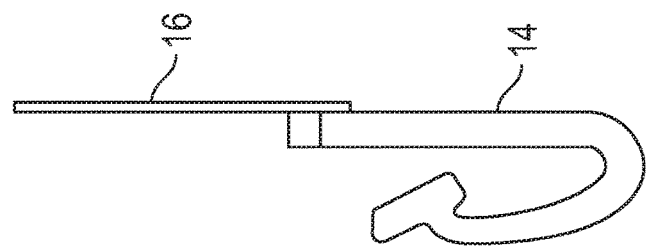
FIG. 2 schematically illustrates a side view of a first embodiment of the J-clip attached to a non-woven or carpet.

In one example shown in FIG. 2, the J-clip 14 is attached to one side of the non-woven 16. In another example shown in FIG. 3, the J-clip 14 is attached to both sides of the non-woven 16. In this example, the J-clip 14 is molded around a portion of the non-woven 16 such that the non-woven 16 is inside a portion of the J-clip 14. In one example, a portion of the non-woven 16 is located within the straight portion of the J-clip 14.

When an occupant sits on the vehicle seat, the non-woven 16 "folds" and bends, so that a force generated is transferred to the non-woven 16 instead of the J-clip 14, preventing the load from transferring to the J-clip 14. This prevents the J-clip 14 from moving and disengaging from the cushion frame 12. The "folding" of the non-woven 16 allows the J-clip 14 to stay intact with the cushion frame 12. The attachment of the J-clip 14 and the non-woven 16 allows a high load to be applied to the seat. As the non-woven 16 is weaker than the J-clip 14, the non-woven 16 will deflect first and will not transfer load to the J-clip 14.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle seat module comprising:
   a non-woven material;
   a J-clip including a substantially straight portion and a curved portion having an end region, the end region having a distal end that is distal to a cushion frame and a proximal end that is proximal to the cushion frame in an attached condition, wherein the non-woven material is secured to the J-clip to define a single component; and
   a trim cover attached to the non-woven material, wherein the J-clip is attached to the cushion frame in the attached condition to attach the trim cover to the cushion frame,
   wherein the proximal end of the end region includes a flat surface configured to contact a flat surface of the cushion frame and hold the J-clip and the cushion frame in the attached condition, and
   wherein the flat surfaces are provided at an inclined angle with respect to a direction extending orthogonal to the extending direction of the substantially straight portion.

2. The vehicle seat module as recited in claim 1 wherein the J-clip is polypropylene.

3. The vehicle seat module as recited in claim 1 wherein the non-woven material is polyester.

4. The vehicle seat module as recited in claim 1 wherein the non-woven material is secured to the J-clip with an adhesive.

5. The vehicle seat module as recited in claim 1 wherein the non-woven material is secured to the J-clip with stitches formed by sewing.

6. The vehicle seat module as recited in claim 1 wherein the non-woven material is secured to the J-clip by molding a portion of the J-clip around the non-woven.

7. The vehicle seat module as recited in claim 1 wherein the non-woven material is attached to the trim cover with stitches along a sewing line.

8. The vehicle seat module as recited in claim 1 wherein a curved portion of the J-clip receives a portion of the cushion frame.

9. The vehicle seat module as recited in claim 1 wherein a foam pad is located between the trim cover and the cushion frame.

10. The vehicle seat module as recited in claim 1 wherein the J-clip is attached to one side of the non-woven material.

11. The vehicle seat module as recited in claim 1 wherein the J-clip is attached to both sides of the non-woven material.

12. The vehicle seat module as recited in claim 11 wherein the non-woven material is secured to the J-clip by molding a portion of the J-clip around the non-woven material such that the non-woven material is inside a portion of the J-clip.

13. The vehicle seat module as recited in claim 12 wherein the portion of the non-woven material is located within a straight portion of the J-clip.

14. A vehicle seat module comprising:
    a polyester non-woven material comprising polypropylene;
    a J-clip including a substantially straight portion and a curved portion having an end region, wherein the end region has a distal end that is distal to a cushion frame and a proximal end that is proximal to the cushion frame in an attached condition, the polyester non-woven material is located within the substantially straight portion of the J-clip such that the J-clip is attached to both sides of the polyester non-woven material to secure the polyester non-woven material to the J-clip, and the curved portion of the J-clip receives a portion of the cushion frame to attach a trim cover to the cushion frame in the attached condition;
    the trim cover attached to the polyester non-woven material with stitches along a sewing line; and
    a foam pad located between the trim cover and the cushion frame,
    wherein the proximal end of the end region includes a flat surface configured to contact a flat surface of the cushion frame and hold the J-clip and the cushion frame in the attached condition, and
    wherein the flat surfaces are provided at an inclined angle with respect to a direction extending orthogonal to the extending direction of the substantially straight portion.

15. A method of transferring a load on a vehicle seat comprising:
    applying a load on a vehicle seat; and
    transferring a force to a non-woven material attached to a J-clip to bend the non-woven material attached to a J-clip, wherein the J-clip includes a substantially straight portion and a curved portion having an end region, wherein the end region has a distal end that is distal to a cushion frame and a proximal end that is proximal to the cushion frame in an attached condition, the proximal end of the end region including a flat surface configured to contact a flat surface of the cushion frame and hold the J-clip and the cushion frame in the attached condition, wherein provided at an inclined angle with respect to a direction extending orthogonal to the extending direction of the substantially straight portion, and the J-clip is attached to the cushion frame.

16. The vehicle seat module as recited in claim 1 wherein the proximal end of the end region of the curved portion of the J-clip engages the cushion frame and is blunt.

17. The vehicle seat module as recited in claim 14 wherein the proximal end of the end region of the curved portion of the J-clip engages the cushion frame and is blunt.

18. The method as recited in claim 15 wherein the proximal end of the end region of the curved portion of the J-clip engages the cushion frame and is blunt.

19. A method as recited in claim 15 including positioning a solid foam pad between a trim cover and the cushion frame.

20. The vehicle seat module as recited in claim 1 wherein the distal end and the proximal end of the end region of the curved portion are connected by a flat surface.

21. The vehicle seat module as recited in claim 14 wherein the distal end and the proximal end of the end region of the curved portion are connected by a flat surface.

22. The method as recited in claim 15 wherein the distal end and the proximal end of the end region of the curved portion are connected by a flat surface.

23. The vehicle seat module as recited in claim 1 wherein a most proximal end of the proximal end of the end region is blunt.

24. The vehicle seat module as recited in claim 14 wherein a most proximal end of the proximal end of the end region is blunt.

25. The method as recited in claim 15 wherein a most proximal end of the proximal end of the end region is blunt.

\* \* \* \* \*